US011512605B2

(12) United States Patent
Gimat et al.

(10) Patent No.: US 11,512,605 B2
(45) Date of Patent: Nov. 29, 2022

(54) ATTACHMENT OF A NOZZLE TO A CASING OF A TURBOMACHINE

(71) Applicant: SAFRAN AIRCRAFT ENGINES, Paris (FR)

(72) Inventors: Matthieu Arnaud Gimat, Moissy-Cramayel (FR); Lucien Henri Jacques Quennehen, Moissy-Cramayel (FR); Gilles Gérard Claude Lepretre, Moissy-Cramayel (FR); Nicolas Paul Tableau, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 33 days.

(21) Appl. No.: 16/527,592

(22) Filed: Jul. 31, 2019

(65) Prior Publication Data
US 2020/0040748 A1 Feb. 6, 2020

(30) Foreign Application Priority Data

Jul. 31, 2018 (FR) ...................................... 1857149

(51) Int. Cl.
*F01D 9/04* (2006.01)
*F01D 25/24* (2006.01)
(Continued)

(52) U.S. Cl.
CPC .............. *F01D 9/042* (2013.01); *F01D 9/041* (2013.01); *F01D 25/246* (2013.01); *F01D 25/26* (2013.01);
(Continued)

(58) Field of Classification Search
CPC ... F01D 9/02; F01D 9/04; F01D 9/041; F01D 9/042; F01D 25/243; F01D 25/246;
(Continued)

(56) References Cited

U.S. PATENT DOCUMENTS

| 2012/0301312 A1* | 11/2012 | Berczik | C04B 37/00 |
| | | | 416/230 |
| 2014/0064956 A1* | 3/2014 | Drane | F01D 9/042 |
| | | | 415/209.3 |

(Continued)

FOREIGN PATENT DOCUMENTS

| CA | 2 926 643 A1 | 4/2015 |
| FR | 2 981 602 A1 | 4/2013 |
| WO | WO 2013/079859 A1 | 6/2013 |

OTHER PUBLICATIONS

French Application No. 1857149; Search Report dated Apr. 2, 2019—6 pgs. (relevance found in the citations therein).

*Primary Examiner* — Eldon T Brockman
*Assistant Examiner* — Elton K Wong
(74) *Attorney, Agent, or Firm* — Lathrop GPM LLP

(57) ABSTRACT

The invention relates to an assembly comprising a turbomachine casing (7) and a nozzle made of ceramic matrix composite material having a blade (21), the frontside and backside surfaces of which delimit an internal cavity, and which is connected at its radially external end by a connecting part (31) of the nozzle to the casing (7), said connecting part (31) extending substantially radially outwards, the blade (21) and said connecting part (31) being formed in one piece, said assembly being characterized in that the connecting part (31) is fastened to a first radial wall (51) integral with the casing (7) by fastening means (53).

17 Claims, 4 Drawing Sheets

(51) Int. Cl.
*F01D 25/26* (2006.01)
*F01D 25/28* (2006.01)
*F01D 5/28* (2006.01)

(52) U.S. Cl.
CPC .............. *F01D 25/28* (2013.01); *F01D 5/282* (2013.01); *F05D 2220/32* (2013.01); *F05D 2230/60* (2013.01); *F05D 2240/128* (2013.01); *F05D 2300/6033* (2013.01)

(58) Field of Classification Search
CPC . F01D 25/26; F01D 25/28; F01D 5/28; F01D 5/282; F01D 5/284; F05D 2240/128; F05D 2300/6033; F05D 2230/60
USPC ............................................ 415/209.3–209.4
See application file for complete search history.

(56) References Cited

U.S. PATENT DOCUMENTS

2014/0161623 A1* 6/2014 Zurmehly ............... F01D 5/284
  416/241 R
2018/0230857 A1* 8/2018 Weaver .................. F01D 9/041

* cited by examiner

ATTACHMENT OF A NOZZLE TO A CASING OF A TURBOMACHINE

CROSS-REFERENCE TO RELATED APPLICATION

This application claims priority to French Patent Application No. 1857149, filed Jul. 31, 2018, which is incorporated herein by reference.

FIELD OF THE INVENTION

This invention relates to the connection between a ceramic matrix composite material (CMC) nozzle and a metal turbomachine casing.

TECHNICAL BACKGROUND

Turbine 3 nozzles 1 radially extend between stator walls 5 and an external turbomachine casing 7. The nozzles 1 are used to channel and orient the gas flow through the primary jet 9 of the turbomachine. A turbine 3 is composed of several stages. Each stage includes a stationary nozzle 1 and a movable impeller 11.

In the current turbines 3, the nozzle 1 is commonly made of a metallic material and consists of guide vanes 13 delimited by radially internal 15 and radially external 17 platforms. The radially internal and radially external platforms 15, 17 radially define between them the primary jet 9 through which the gas flow passes. The areas radially inside the radially internal platform 15 and radially outside the radially external platform 17 are considered off-jet.

Generally, the radially external platforms 17 include at their upstream and downstream ends flanges 19 extending radially outwards and then longitudinally protruding from the blade 21 of the nozzle 1. The flanges 19 are intended to fasten the nozzle 1 to the outer casing 7, so that the parts extending substantially axially with respect to the flanges are supported on casing 7 rails 23.

In addition, in the current configurations, the metal nozzles 1 are subjected to forces related to the aerodynamic flow of air in the jet 9. The nozzle 1 is also subjected to a piston effect due to pressure differences between each stage of the turbomachine. The pressure decreases as the air passes through the turbine 3. Thus, the upstream end 25 and the downstream end 27 of the radially internal off-jet part which the nozzle 1 is fastened to are subjected to different pressures. This pressure difference in the radially internal off-jet part generates a force in the downstream direction, represented by an arrow F. The forces related to the aerodynamic flow and the piston effect, described above, create a moment at the attachment between the nozzle 1 and the casing 7. This moment can damage the nozzle 1.

A nozzle 1 made of CMC material is preferable to a metallic nozzle 1 since the CMC nozzles 1 increase the performance of the turbines 3 by reducing the amount of cooling gas required. However, manufacturing a CMC nozzle 1 with the same shape as a metal nozzle 1 is complex and it is not optimal to want to attach it to the casing 7 in the same way as a metal nozzle 1. As a matter of fact, the differential expansion between parts made of metallic material and CMC prevents particular arrangements of metallic parts and others made of CMC. In addition, the CMC material is abrasive, so the flanges of the CMC nozzle 1 would damage the metal rails 23 of the casing 7.

The invention aims in particular to provide a simple and effective solution to the problems associated with mounting a CMC nozzle 1 in a turbine 3, and more particularly its attachment to a metal casing 7.

SUMMARY OF THE INVENTION

For this purpose, it proposes an assembly comprising a turbomachine casing and a nozzle made of ceramic matrix composite material having a blade, the frontside and backside surfaces of which delimit an internal cavity, and which is connected at its radially external end by a connecting part of the nozzle to the casing, said connecting part extending substantially radially outwards, the blade and said connecting part being formed in one piece, said assembly being characterized in that the connecting part is fastened to a first radial wall fastened to the casing by fastening means.

Such a nozzle consists of a blade and a connecting part produced in one piece, which allows the forces induced by the aerodynamic flows and the most direct piston effect possible to flow.

The blade and the connecting part are produced by sagging two-dimensional fibrous fabrics bonded at the leading and trailing edges of the blade. The fibrous fabrics are fibrous reinforcements.

In another embodiment, the blade and the connecting part are obtained by three-dimensional weaving. The fact that the blade and the connecting part are in one piece guarantees the continuity of the reinforcing fibres between the blade and the connecting part.

In addition, the fastening of the connecting part on a radial wall integral with the casing makes it possible to take up the forces over the entire connecting part, which is not the case for a connecting part resting on a casing rail.

Advantageously, the radially external end of said connecting part comprises at least one radial flange, strictly extending radially and being applied in the circumferential direction on said first radial wall.

The fact that the radial flange is arranged at the radially external end of the connecting part allows the latter to be applied and fastened, without clearance, to the radial wall integral with the casing. The absence of clearance between the radial flange and the radial wall integral with the casing makes it possible to avoid the presence of a moment between these two radial walls, and consequently to prevent an accelerated degradation of the fastening between the radial flange and the radial wall integral with the casing.

According to a characteristic of the invention, the assembly comprises an intermediate part for fastening the nozzle to the casing, the intermediate part comprising a circumferential wall and said at least one first radial wall which extends radially inward from said circumferential wall and is fastened to said at least one radial flange of the connecting part.

In a preferred embodiment, the nozzle is not directly fastened to the casing but to an intermediate part which comprises a circumferential wall from which a wall extends radially inward. The radial flange of the connection part of the nozzle is fastened to the radial wall of the intermediate part. The circumferential wall of the intermediate part can thus be configured in such a way that a CMC nozzle can be fastened to the casing. Since the intermediate part is preferably made of metal, the fastening areas of the intermediate part can be similar by fastening a metal nozzle to a metal casing.

In a particular embodiment, the nozzle comprises a platform having a circumferential wall externally delimiting an air flow path and a second radial wall extending radially outwards from said circumferential wall, said second radial wall being fastened by said fastening means to the first radial wall and said connecting part.

In a second preferred embodiment, compatible with the embodiment described above, the nozzle includes a platform at the radially external end of the blade. This platform includes a circumferential wall from which a radial wall extends radially outwards. The radial wall of the platform extends substantially parallel to the connecting part of the nozzle. Said radial wall of the platform is fastened to the connecting part and to the radial wall integral with the casing, so as to stiffen the fastening thereof.

Advantageously, fastening means pass through said at least one fastening flange of the connecting part, said first radial wall of the intermediate part and said second radial wall of the platform.

In order to stiffen the fastening between the connecting part and the radial wall integral with the casing, it is preferable that the fastening means also pass through the radial wall of the platform in order to press the various radial walls against each other and avoid the creation of a moment around the fastening means. A moment is defined by a rotating movement of at least one of the walls relative to a stationary element, in this case the fastening means.

Preferably, said at least one radial flange is bolted to said first wall.

The bolted fastening of the radial flange on the radial wall of the casing thus prevents any movement of the nozzle with respect to the casing or an intermediate part fastened to the casing. Therefore, such a fastening avoids friction of the CMC nozzle, the material of which is abrasive on the metal surface of the casing or the intermediate part.

Advantageously, the connecting part comprises at least one opening in fluid communication with the internal cavity of the blade.

The connecting part comprises at least one opening to allow fluid communication of air between the off-jet part radially outside the nozzle and the off-jet part radially inside the nozzle through the opening and the internal cavity of the blade.

Advantageously, the ceramic matrix composite material of the blade and the connecting part includes continuous reinforcing fibers preferentially extending in the radial direction.

The radial direction of the reinforcing fibres in the CMC material of the blade and the connecting part allows these parts to have a better resistance to aerodynamic forces caused by the flow of air longitudinally moving in the turbomachine.

According to another particular embodiment, the connecting part consists of two radial flanges, with the radial flanges extending parallel and spaced from each other.

These first and second disjoint walls allow less impact on the air flow in the radially external off-jet part since the surfaces intended to be impacted by the air flow are thinner.

The invention will be better understood and other details, characteristics and advantages of the invention will appear when reading the following description, which is given as a non-limiting example, with reference to the attached drawings.

DETAILED DESCRIPTION

In the detailed description below, the first, respectively the second wall of the connecting part extends radially outwards from the backside, respectively the frontside surface of the blade.

Figure 1:
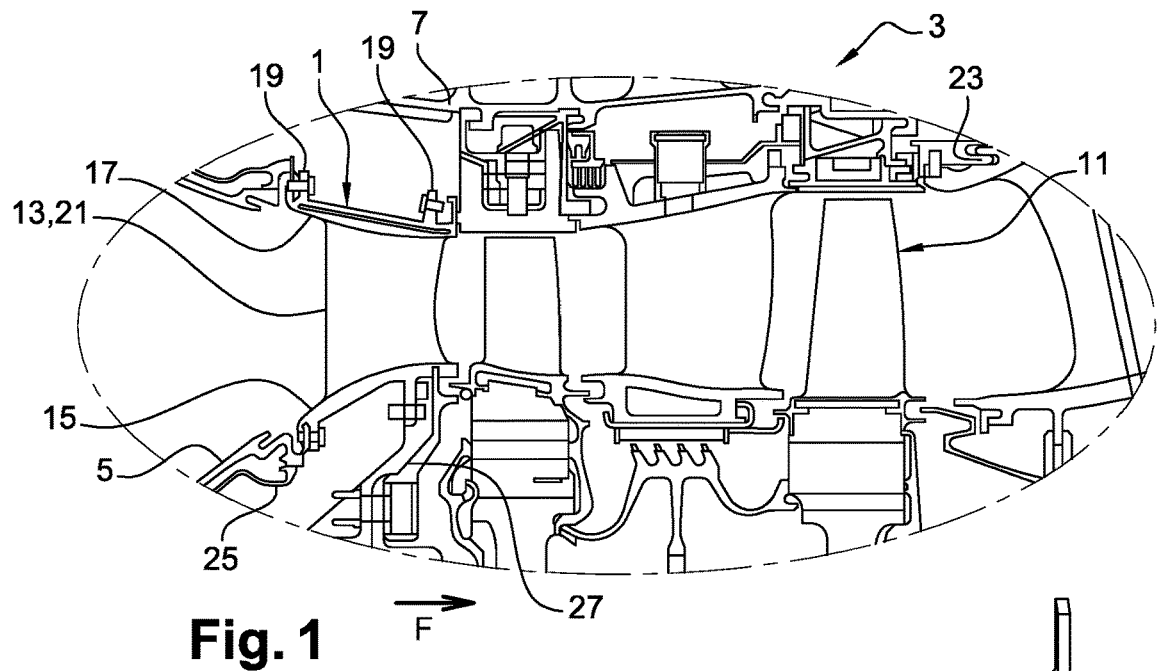
FIG. 1 shows a cross-sectional view of a turbine according to the prior art.

FIG. 1 relates to a turbine 3 of the prior art described above.

The CMC nozzle 1, according to one of the embodiments of the invention, comprises a blade 21 having an internal cavity 29 (FIG. 4A) extending radially. The nozzle 1 comprises, at the radially internal and external ends, respectively radially internal and radially external platforms 15, 17. The radially internal platform 15 is fastened by means of fastening means to a radially internal stator wall 5 of the turbomachine. The nozzle 1 also includes a connecting part 31 for fastening the nozzle 1 to the casing 7. The connecting part 31 consists of a part in one piece with the blade 21 and extends radially outwards from the radially external end of said blade 21. The blade 21 and the connecting part 31 consist of at least two impregnated fibrous fabrics or at least two stacks of impregnated fibrous fabrics connected at the leading edge 33 and the trailing edge 35 forming the internal cavity 29 of the blade 21. The impregnated fabrics of the connecting part 31 form a first wall 37 and a second wall 39 connected in the extension of the blade at the leading edge 33 and the trailing edge 35.

In another embodiment, the blade 21 and the connecting part 31 can be formed using a single fibrous fabric constituting a preform. Such an embodiment is advantageous in that the reinforcement formed by the blade 21 and the connecting part 31 is continuous and has a good mechanical reaction to the stresses. This preform can be obtained by three-dimensional weaving.

In the case where the blade 21 and the connecting part 31 are obtained using a single fibrous fabric, the leading edge 33 and the trailing edge 35 are naturally connected by strands that ensure cohesion in the thickness of the preform.

The first and second walls 37, 39 extend radially outwards on either side of the internal cavity 29 formed in the blade 21. The blade 21, the connecting part 31 and the radially internal and external platforms 15, 17 are made of CMC material respectively. The CMC material consists of a fibrous texture and a matrix.

The matrix is preferably made according to the chemical vapor silicon carbide infiltration process according to the CVI (Chemical Vapor infiltration) process and/or by melting according to the MI (Melt Infiltration) process. The matrix can also be produced using the PIP (Polymer Impregnation and Pyrolysis) process, or using the SIC process.

Preferably, the reinforcing fibres used are HiNiS silicon carbide fibres.

Optionally, at least one of the platforms 15, 17 is formed integrally with the blade 21 and the connecting part 31 by three-dimensional fibrous weaving between the reinforcing fibres of the blade 21 and the connecting part 31 and the fibres of the platform.

Alternatively, said platform 15, 17 can be obtained in one piece with the blade 21 and the connecting part 31 by gluing using the ceramic materials matrix of the platform 15, 17, the blade 21 and the connecting part 31. The matrix here acts as a binder when the silicon rises from the matrix of the CMC material.

Figure 2A:
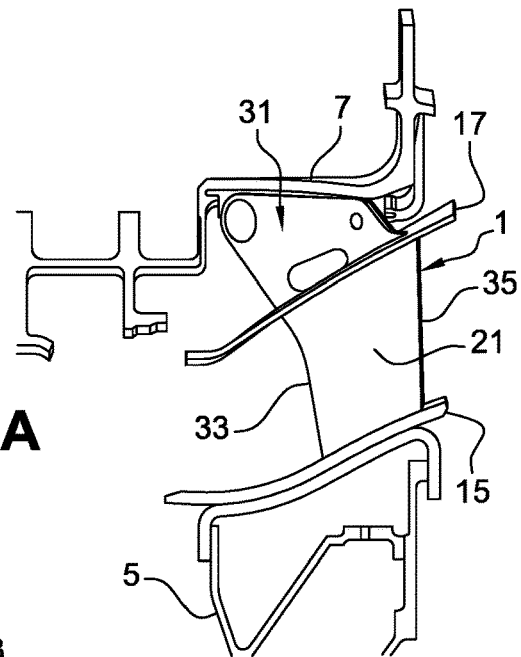
FIG. 2A is a sectional view of a nozzle in a turbomachine according to a first embodiment of the invention.
Figure 2B:
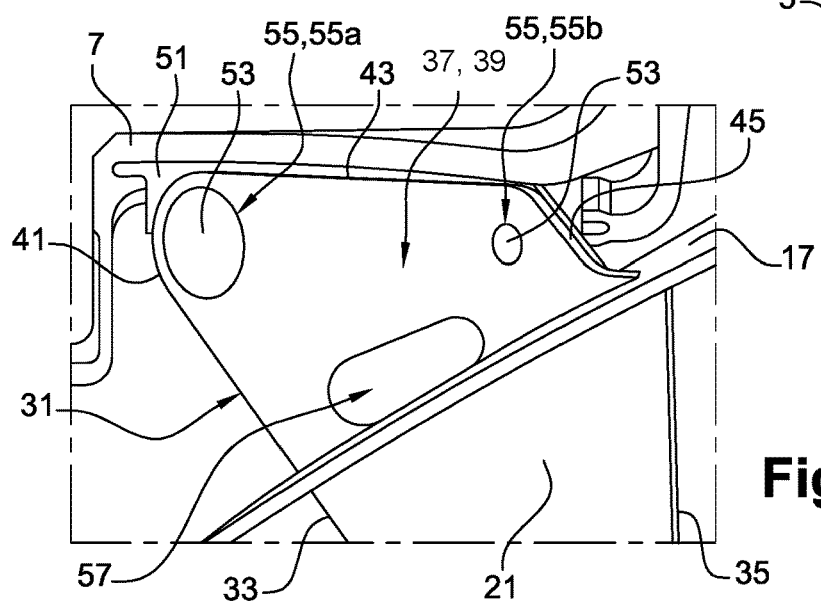
FIG. 2B is an enlarged view of the radially external part of the nozzle shown in FIG. 2A.

FIGS. 2A and 2B are now referred to, which represent a CMC nozzle 1 according to a first embodiment.

The radially internal platform 15 is radially supported and fastened to a stator wall 5 of the turbine 3.

The upstream edge 41 of the connecting part 31 formed by the connection of the first and second walls 37, 39 extends radially outwards in the extension of the leading edge 33 of the blade 21 and matches its profile. The radially external edge 43 of the connecting part 31 extends substantially longitudinally to conform to the shape of the casing wall 7.

The downstream edge 45 of the connecting part 31 formed by the connection of the first and second walls 37, 39 extends radially outwards in the extension of the trailing edge 35 so as to be substantially parallel to the upstream edge 41. The connecting part 31 has a fillet between the upstream edge 41 and the radially external edge 43 of the connecting part. The same applies between the downstream edge 45 and the radially external edge 43 of the connecting part 31.

The fibrous fabrics of the first and second walls 37, 39 arranged on either side of the internal cavity 29 of the blade 21 are circumferentially abutting against each other, so that the two fabrics extend parallel and strictly radially at the contact zone 47. The fabrics of the first and second walls 37, 39 are connected to each other at the contact zone 47, so as to form a radial fastening flange 49.

Said connection can be reinforced with reinforcing fibres extending in a direction transverse to said direction of extension of the radial fastening flange 49.

In another embodiment, said connection can be obtained by gluing. As described above, the matrix of the first and second walls 37, 39 can act as a binder between two ceramic parts of the same construction.

The radial fastening flange 49 is fastened to a radial wall 51 fastened to the casing 7 by means of fastening means 53. The attachment is provided by bolts. Thus, said radial flange 49 includes two ports 55, 55a, 55b through which fastening means 53 pass. The first port 55a is larger than the second port 55b.

When the nozzle 1 is fastened to the casing 7, the fastening means 53 extend substantially transversely through the radial connecting flange 49 and the radial wall 51 integral with the casing 7.

The connecting part 31 also has an opening 57 transversely leading to the radial extension direction of the connecting part 31. This opening 57 is radially delimited so as to be flush with the radially internal end of the radial flange 49 and the radially external end of the radially external platform 17. This opening 57 is in fluid communication with the internal cavity 29 of the blade 21 and allows the radially internal and external off-jet parts with respect to the nozzle 1 to be in fluid communication.

Figure 3A:
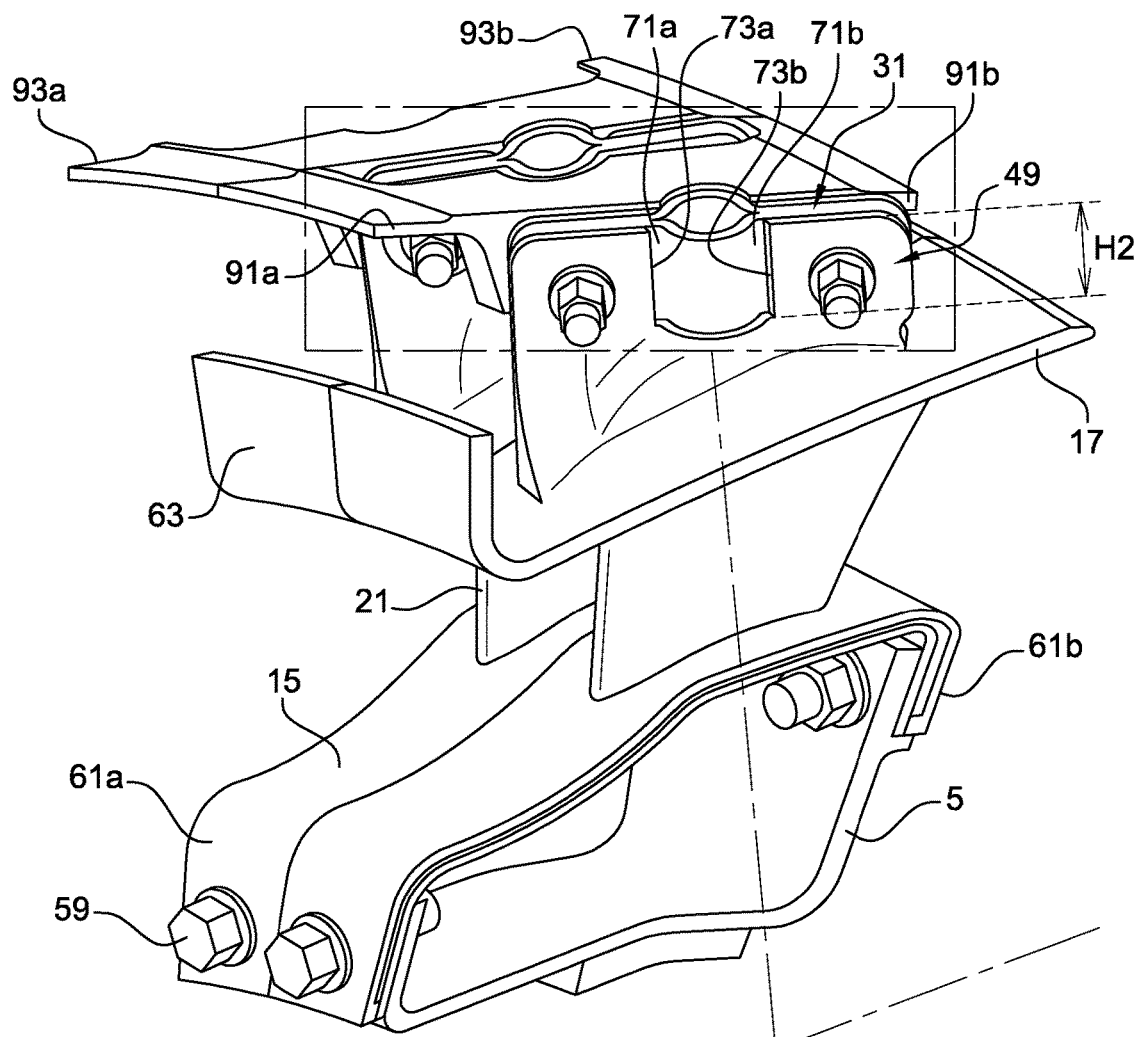
FIGS. 3A and 3B show perspective views of a nozzle according to a second embodiment of the invention.
Figure 3A:
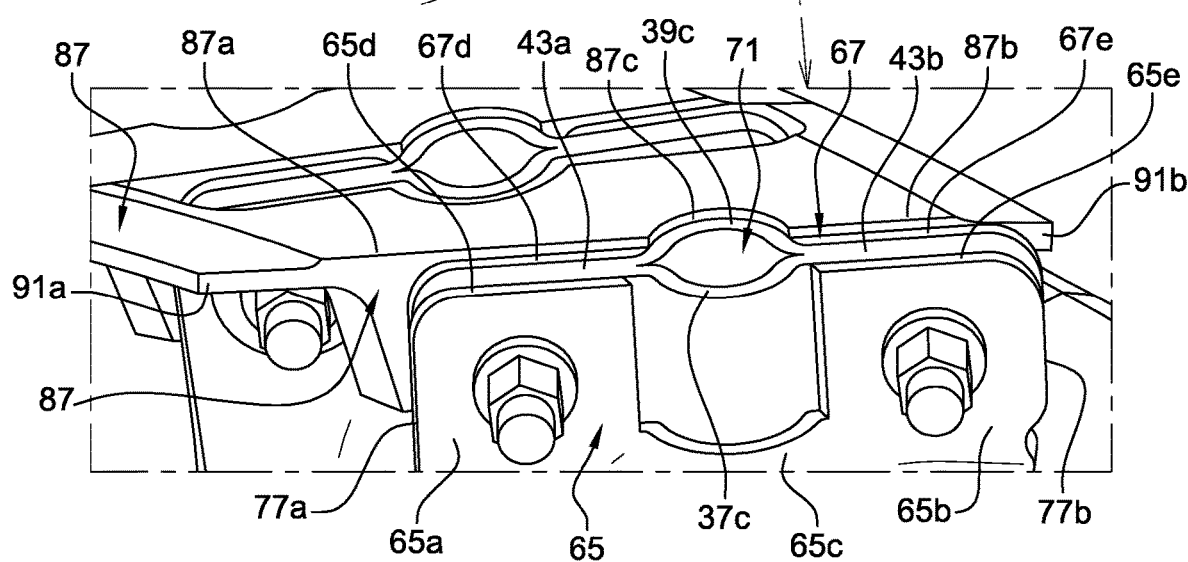
Figure 3B:
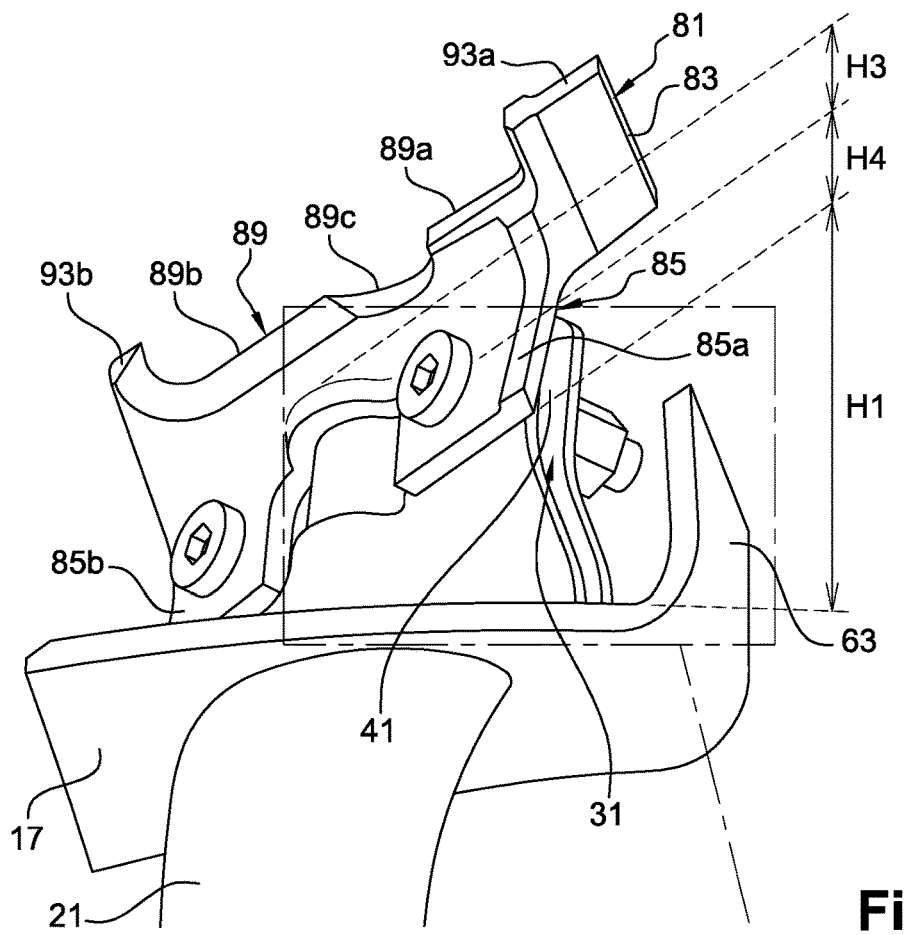
Figure 3B:
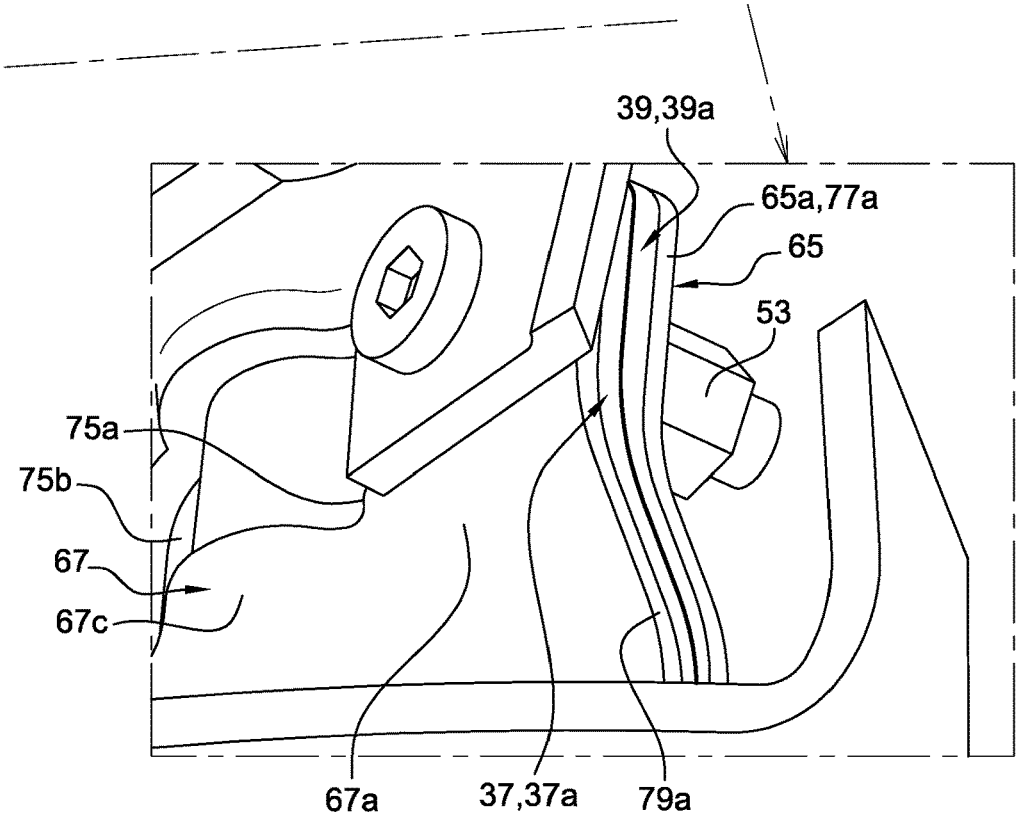

FIGS. 3A and 3B, which represent a nozzle 1 according to a second embodiment, are now referred to.

The radially internal platform 15 is bolted 59 at an upstream flange 61a and a downstream flange 61b on an upstream flange and a downstream flange of a stator wall 5.

The radially external platform 17 includes a flange 63 extending radially outward at the upstream end. The radially external platform 17 also includes first and second walls 65, 67 extending radially outward from the circumferential wall 69 of the radially external platform 17. These walls 65, 67 are arranged on either side of the connecting part 31. The first wall 65, respectively the second wall 67, extending radially outwards from the radially external circumferential wall 69 of the radially external platform 17 follows the shape of the first wall 37 of the connecting part 31, respectively the second wall 39 of the connecting part 31.

The first and second walls 37, 39 of the connecting part 31 extend radially outwards in a substantially planar manner at the upstream 37a, 39a and downstream ends (not visible). The first and second walls 37, 39 of the connecting part 31 extend radially along a radial component and a circumferential component towards the backside surface of the blade over a first height H1 and then strictly in a radial direction over a second height H2. The first and second walls 37, 39 of the connecting part 31 also extend in a direction having a circumferential component and a longitudinal component substantially similar or parallel to the direction connecting the leading edge 33 to the trailing edge 35 of the blade 21, in a radial cross-sectional plane.

The substantially flat upstream 37a, 39a and downstream ends of the first wall 37 and the second wall 39 of the connecting part 31 are pressed against each other. The upstream end 37a, 39a respectively the downstream end of the first wall 37 and the second wall 39 are fastened against each other by reinforcement in the third direction or gluing, as described above, thus forming a radial flange 49, also called a radial fastening flange. Between their upstream 37a, 39a and downstream ends, the first wall 37 and the second wall 39 respectively comprise an intermediate part 37c, 39c extending in a direction transverse to the direction of longitudinal and circumferential extension of the connecting part 31. The intermediate part 37c, 39c of the first wall 37, respectively the second wall 39, extends in the transverse direction opposite the second wall 39, respectively the first wall 37, so that the first wall 37 and the second wall 39 are spaced from each other at their respective intermediate parts 37c, 39c.

The intermediate parts 37c, 39c of the first wall 37 and the second wall 39 are arranged opposite each other and include a complementary shape defining a radially extending channel 71 between them. Said channel 71 radially extends between the internal cavity 29 of the blade 21 and the radially external off-jet part. This channel 71 thus allows a fluid communication between the radially external and radially internal off-jet part of the turbine 3.

Optionally, the intermediate parts 37c, 39c, of the first and second walls 37, 39 of the connecting part 31, respectively define a circular half tube. Thus, when the first wall 37 and the second wall 39 of the connecting part 31 are applied and connected to each other, the intermediate parts 37c, 39c of the first wall 37 and the second wall 39 together define a cylindrical tubular channel 71.

The first radial wall 65 and the second radial wall 67 of the radially external platform 17 extend radially outwards on either side of the connecting part 31. Said first and second 65, 67 radial walls of the radially external platform 17 respectively comprise an upstream end 65a, 67a, a downstream end 65b (the downstream end of the second wall 67 being invisible) and an intermediate part 65c, 67c.

The upstream end 65a, 67a, the intermediate part 65c, 67c and the downstream end 65b of the first radial wall 65, respectively second radial wall 67, of the radially external platform 17 conform to the shapes of the upstream end 37a, 39a, the intermediate part 37c, 39c and the downstream end of the first wall 37, respectively second wall 39, of the connecting part 31 on said first height H1. The downstream edge 73a, 75a of the upstream end 65a, 67a, respectively the upstream edge 73b, 75b of the downstream end 65b of the first radial wall 65b and the second radial wall 67 of the radially external platform 17 extending radially outwards are flush with the upstream end 71a, respectively the downstream end 71b of the channel 71.

On said second height H2, the upstream 65a, 67a and downstream 65b ends of said first and second walls 65, 67 of the radially external platform 17 extend radially outwards along a strictly radial component protruding from their respective intermediate parts 65c, 67c. The upstream edge 77a, 79a and the radially external end 65d, 67d of the upstream end 65a, 67a of the first and second radial walls 65, 67 of the radially external platform are flush with the upstream edge 41 and the radially external end 43a of the upstream end 37a, 39a of the first and second walls 37, 39 of the connecting part 31. Respectively, the downstream edge 77b and the radially external end 65e, 67e of the downstream end of the first and second radial walls 65, 67 of the radially external platform 17 are flush with the downstream edge and the radially external end 43b of the downstream end of the first and second walls 37, 39 of the connecting part 31.

The connecting part 31 of the nozzle 1 according to the second embodiment is fastened to the casing 7 by means of an intermediate part 81.

The intermediate part 81 comprises a circumferential wall 83 from which a wall 85 extends radially inward. The circumferential wall 83 of the intermediate part 81 is arranged circumferentially between two connecting parts 31 extending radially outwards from the radially external end of two consecutive blades 21 of the same nozzle 1. The circumferential wall 83 of the intermediate part 81 thus provides a circumferential support on a said first radial wall 65 of the radially external platform 17 of a first blade 21 and a said second radial wall 67 of the radially external platform 17 of a second blade 21.

The circumferential wall 83 longitudinally extends from the upstream radial flange 63 of the external radial platform 17 and protrudes downstream of the downstream end of the connecting part 31. The circumferential wall 83 of the intermediate part 81 comprises first and second circumferential flanks 87, 89 longitudinally extending at the circumferential ends of the circumferential wall 83. The two circumferential flanks 87, 89 respectively include an upstream end 91a, 93a, a first part 87a, 89a, an intermediate part 87c, 89c, a second part 87b, 89b and a downstream end 91b, 93b.

The first and second parts 87a, 87b of the first circumferential flank 87b conform to the shape of the upstream end 65a and the downstream end 65b of the first radial wall 65 of the radially external platform 17 of the first blade 21. The intermediate part 87c of the first flank 87c conforms to the shape of the intermediate part 37c of the first wall 37 of the connecting part 31 of said first blade 31. Respectively, the first and second parts 89a, 89b of the second circumferential flank 89 conform to the shape of the upstream end 67a and the downstream end of the second radial wall 67 of the radially external platform 17 of the second blade 21. The intermediate part 89c of the second flank 89 conform to the shape of the intermediate part 39c of the second wall 39 of the connecting part 31 of the second blade 31. In this way, the intermediate part 87c, 89c of the first and second circumferential flanks 87, 89c circumferentially extends but are set back from their respective upstream 87a, 89a and downstream 87, 89b ends. The upstream and downstream ends 93a, 93b of the second circumferential flank 89 circumferentially extend in a protruding manner with respect to the first and second parts 89a, 89b and the intermediate part 89c. Thus, two consecutive intermediate parts 81 are form-fit supported on the entire periphery of the external radial end of the radial flange 49 of said connecting part 31.

The upstream and downstream ends 93a, 93b of the second circumferential flank 89 are circumferentially abutting at the upstream and downstream ends 91a, 91b of the first circumferential flank 87 of a second intermediate part 81. The upstream and downstream ends 93a, 93b of the second circumferential edge 89 thus longitudinally extend and protrude from the upstream and downstream ends 37a, 39a, 65a, 65b, 67a of the first and second walls 37, 39 of the connecting part 31 as well as the first and second radial walls 65, 67 of the radially external platform 17 which conform to the shape of said connecting part 31. The upstream and downstream ends 93a, 93b of the second circumferential flank 89 thus provide longitudinal support on the upstream edge 41 of the first and second walls 37, 39 of the connecting part 31 as well as the upstream edge 77a, 79a of the first and second radial walls 65, 67 of the radially external platform 17 which conform to the shape of said connecting part 31.

The radial wall 85 of the intermediate part 81 radially extends in a strictly radial direction from the first and second parts 87a, 87b and the intermediate part 87c of the first circumferential flank 87c. The radial wall 85 thus comprises a first part 85a, a second part 85b and an intermediate part 85c longitudinally arranged between the first and second parts 85a, 85b. The radial wall 85 of the connecting part 81 extends over a third height H3 so that the first and second parts 85a, 85b of the radial wall 85 conform to the upstream and downstream ends 67a of the second radial wall 67 of the radially external platform 17. On this so-called third height H3, the intermediate part 85c of the radial wall 85 of the intermediate part 81 conforms to the shape of the intermediate part 39c of the second wall 39 of the connecting part 31. The first and second parts 85a, 85b of the radial wall 85 extend radially inwards over a fourth height H4 with respect to the intermediate part 85c of said radial wall 85 of the intermediate part 81. The inner radial ends of the first and second parts 85a, 85b are flush with the radially internal ends from which the second radial wall 67 of the radially external platform 17 extends radially outwards along a strictly radial component.

The first part 85a, respectively the second part 85b, of the radial wall 85 of the intermediate part 81, as well as the upstream end 41, respectively the downstream end 41, of the connecting part 31 and the first and second radial walls 65, 67 of the radially external platform 17 extending radially along a strictly radial component are provided with a port through which a fastening means 53 passes. The fastening means 53 is typically of the bolting type.

Optionally, the radial wall 85 of the intermediate part 81 can extend from the second circumferential edge 89 of the circumferential wall. In this case, the fastening with the connecting part 31 and the radial walls 65, 67 of the radially external platform 17 will be identical to what is described in the previous paragraph except that the radial wall 85 will come substantially in circumferential abutment with the first radial wall 65 of the adjacent radially external platform 17.

Preferably the intermediate part 81 is made of a metallic material, which allows a CMC nozzle according to the second embodiment of the invention to be fastened to the casing 7 in a similar way to the nozzles made of a metallic material.

Figure 4A:
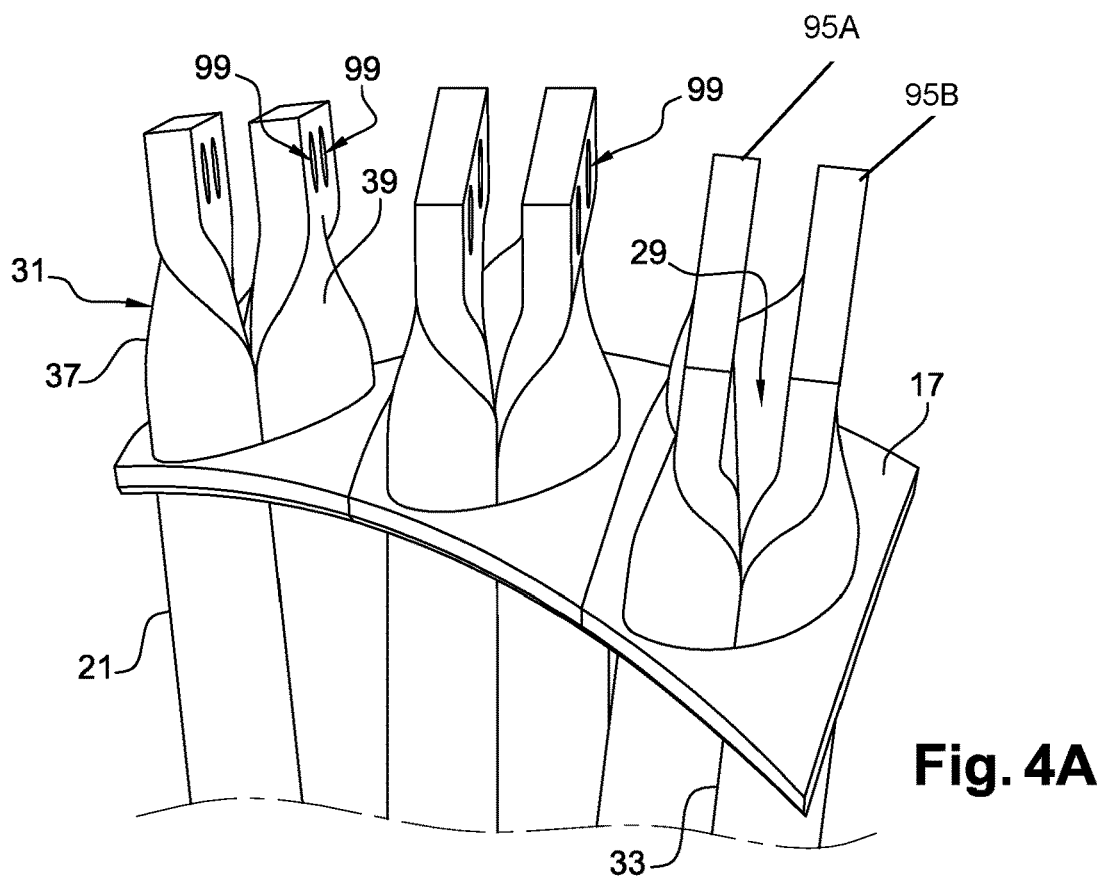
FIG. 4A is a perspective view of a nozzle according to a third embodiment of the invention.
Figure 4B:
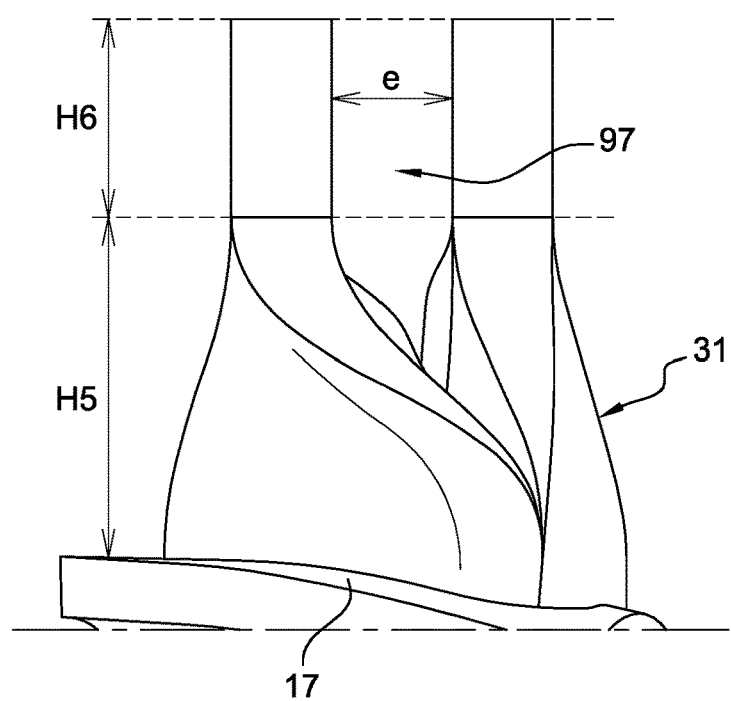
FIG. 4B is a front view of the connecting part of a nozzle, according to a third embodiment of the invention.

FIGS. 4A and 4B are now referred to, which represent a CMC nozzle 1 with a CMC connecting part 31 attached to the casing 7 in a third embodiment.

Similarly to the first and second embodiments, the nozzle 1 comprises a blade 21 and a connecting part 31 obtained from a first and second wall 37, 39 respectively consisting of a stack of fibrous impregnated fabrics of a matrix. The first and second walls 37, 39 extend radially outwards. The fibrous fabrics of the first and second walls are connected to each other at the leading edge 33 and the trailing edge 35 of the blade 21.

The first and second walls 37, 39 of the connecting part 31 longitudinally extend in a direction having a circumferential component and a longitudinal component substantially similar or parallel to the direction connecting the leading edge 33 to the trailing edge 35 of the blade 21, in a radially cross-sectional plane. The first wall 37 of the connecting part 31 radially extends over a height H5 along a radially outward component and along a component transverse to the longitudinal extension, towards the frontside surface from the radially external end of the blade 21. The second wall 39 of the connecting part 31 radially extends over the same height H5 as the first wall 37 along an outward radial component and a component transverse to the direction of longitudinal extension, towards the backside surface from the external radial end of the blade 21. Thus the first and second walls 37, 39 extend towards each other over the same height H5.

The first and second walls 37, 39 radially extend, from the height H5 onwards, over a height H6, according to a strictly radial component defining a first and a second radial flange 95a, 95b. The first and second radial flanges 49, 95a, 95b extend parallel and are spaced from each other.

The spacing of the first and second flanges 49, 95a, 95b forms an opening 97 leading out in the longitudinal extension direction of the connecting part 31. This opening 97 is in fluid communication with the internal cavity 29 of the blade 21. Thus the radially external off-jet part is in fluid communication with the radially internal off-jet part.

Each of the first and second radial flanges 49, 95a, 95b has two ports 99. The ports 99 open in the direction transverse to the longitudinal extension direction of the connecting part 31. The ports 99 of the first radial flange 95a are coaxial with the ports 99 of the second radial flange 95b, and are preferably longitudinally aligned.

When a nozzle 1 according to the third embodiment is fastened to the casing 7, a radial wall integral with the casing 7 is arranged between the two radial flanges 49, 95a, 95b of the connecting part 31. This radial wall integral with the casing 7 is also provided with two longitudinally aligned ports and coaxial with ports 99 of the first and second radial flanges 95a, 95b. The ports 99 of the first and second radial flanges 49, 95a, 95b as well as the radial wall integral with the casing 7 are traversed by two fastening means. Typically, the fastening means are of the bolting type.

Optionally, each of the first and second radial flanges 49, 95a, 95b can be fastened to an independent radial wall integral with the casing.

The invention claimed is:

1. An assembly comprising a turbomachine casing (7) and a nozzle (1) made of ceramic matrix composite material having a blade (21), a frontside and a backside surfaces of which delimit an internal cavity (29), and which is connected at a radially external end of the blade by a connecting part (31) of the nozzle (1) to the casing (7), said connecting part (31) extending radially outwards, the blade (21) and said connecting part (31) being formed in one piece, said assembly being characterized in that the connecting part (31) is fastened to a first radial wall (85) integral with the casing (7) by fastening means (53), wherein the radially external end of said connecting part (31) comprises at least one radial flange (49), extending strictly radially and extending longitudinally in a direction having a circumferential component and a longitudinal component, substantially similar or parallel to a direction connecting a leading edge to a trailing edge of the blade, the radial flange being applied in the circumferential direction to said first radial wall (85).

2. An assembly according to claim 1, characterized in that it the assembly comprises an intermediate part (81) for fastening the nozzle (1) to the casing (7), the intermediate part (81) comprising a circumferential wall (83) and said first radial wall (85), said first radial wall extending radially inward from said circumferential wall (83) and being fastened to said at least one radial flange (49) of the connecting part (31).

3. An assembly according to claim 2, characterized in that the nozzle (1) comprises a platform (17) having a circumferential wall externally defining an air flow path (9) and a second radial wall (65, 67) extending radially outwards from said circumferential wall, said second radial wall (65, 67) being fastened by said fastening means (53) to the first radial wall (85) and said connecting part (31).

4. An assembly according to claim 3, characterized in that fastening means (53) pass through said flange (49) of the connecting part (31), said first radial wall (85) of the intermediate part (81) and said second radial wall (65, 67) of the platform (17).

5. An assembly according to claim 2, characterized in that the nozzle (1) comprises a platform (17) having a circumferential wall externally defining an air flow path (9) and a second radial wall (65, 67) extending radially outwards from said circumferential wall, said second radial wall (65, 67) being fastened by said fastening means (53) to the first radial wall (85) and said connecting part (31).

6. An assembly according to claim 2, characterized in that said at least one radial flange (49) is fastened to said first radial wall (85) by bolting.

7. An assembly according to claim 2, characterized in that the connecting part (31) comprises at least one opening (57, 71, 97) in fluid communication with the internal cavity (29) of the blade (21).

8. An assembly according to claim 1, characterized in that the nozzle (1) comprises a platform (17) having a circumferential wall externally defining an air flow path (9) and a second radial wall (65, 67) extending radially outwards from said circumferential wall, said second radial wall (65, 67) being fastened by said fastening means (53) to the first radial wall (85) and said connecting part (31).

9. An assembly according to claim 8, characterized in that said at least one radial flange (49) is fastened to said first radial wall (85) by bolting.

10. An assembly according to claim 8, characterized in that the connecting part (31) comprises at least one opening (57, 71, 97) in fluid communication with the internal cavity (29) of the blade (21).

11. An assembly according to claim 8, characterized in that the ceramic matrix composite material of the blade (21) and the connecting part (31) comprise continuous reinforcing fibers extending in the radial direction.

12. An assembly according to claim 8, characterized in that said at least one radial flange of the connecting part (31) comprises two radial flanges (49, 95a, 95b), the radial flanges (49, 95a, 95b) extending parallel and being spaced from each other.

13. An assembly according to claim 1, characterized in that the nozzle (1) comprises a platform (17) having a circumferential wall externally defining an air flow path (9) and a second radial wall (65, 67) extending radially outwards from said circumferential wall, said second radial wall (65, 67) being fastened by said fastening means (53) to the first radial wall (85) and said connecting part (31).

14. An assembly according to claim 1, characterized in that said at least one radial flange (49) is fastened to said first radial wall (85) by bolting.

15. An assembly according to claim 1, characterized in that the connecting part (31) comprises at least one opening (57, 71, 97) in fluid communication with the internal cavity (29) of the blade (21).

16. An assembly according to claim 1, characterized in that the ceramic matrix composite material of the blade (21) and the connecting part (31) comprise continuous reinforcing fibers extending in the radial direction.

17. An assembly according to claim 1, characterized in that said at least one radial flange of the connecting part (31) comprises two radial flanges (49, 95a, 95b), the radial flanges (49, 95a, 95b) extending parallel and being spaced from each other.

\* \* \* \* \*